United States Patent Office 3,834,960
Patented Sept. 10, 1974

3,834,960
METHOD OF MAKING FUSIBLE AND ELECTRICAL CONDUCTIVE COATING
Winslow W. Prentice, Pawcatuck, and Markay H. Malootian, Quaker Hill, Conn., assignors to the United States of America as represented by the Secretary of the Navy
Filed Aug. 31, 1973, Ser. No. 393,534
Int. Cl. H01b 13/06, 13/22
U.S. Cl. 156—53                    2 Claims

ABSTRACT OF THE DISCLOSURE

A conductive material formed on the surface of a polyethylene film comprises a homogeneous mixture of polyethylene powder, nickel powder, silver flake and polyethylene oxide of a high molecular weight. The conductive material is bonded by means of fusion to the polyethylene film to form a coating which is then bonded to the outer surface of a polyethylene cable.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to polyethylene jacketed cables and more particularly to a conductive material that can be bonded to such cables.

Foam polyethylene cable when used to form part of a submarine antenna system need selected surface areas that are electrically conductive. Prior art coatings such as conductive paints and adhesives either failed to adhere to the polyethylene jacket or formed such a weak bond to the polyethylene that slight abrasion removed the coatings. Spiral wound wire and metal strips affixed to the outside of cables were also attempted but broke upon the flexing of the cable during use.

SUMMARY OF THE INVENTION

It is therefore a general object and purpose of the present invention to provide an electrically conductive coating. It is a further object to provide the conductive coating to the outer surface of a foam polyethylene jacketed cable. Further objects are that the conductive coated cable have good flexibility, good corrosion resistance in sea water, and capable of being sealed at least to 500 p.s.i.

These and other objects are accomplished according to the present invention by providing a specific electrically conductive mixture and forming a coating by adhering the mixture to a polyethylene film by means of heat and pressure. The coating is then bonded to the outer surface of a polyethylene cable by means of being clamped inside a cylindrical split mold and heated.

DESCRIPTION OF THE PREFERRED EMBODIMENT

A specific mixture for providing an electrical conductive coating for a polyethylene cable has the following composition:

EXAMPLE 1

|  | Percent by weight |
|---|---|
| Polyethylene powder | 35.59 |
| Nickel powder | 14.23 |
| Silver flake | 49.82 |
| Polyethylene oxide | .36 |

The polyethylene powder, nickel powder and a silver flake that are used in the composition are 200 mesh or less in size. The polyethylene oxide has an average molecular weight of 4,000,000. All the above materials are commercially available and should be high quality for best results. In addition, the above components of polyethylene powder, nickel powder and silver flake can be varied by 10% of their respective weights either individually or in unison with other components without destroying the effectiveness of the mixture.

The polyethylene oxide can be increased by up to 10% of its respective weight or decreased anywhere down to zero. Although the polyethylene oxide makes a positive contribution, it has the problem that it is water soluble and would tend to deteriorate the product when in use over an extended period of time.

When the polyethylene oxide is omitted the mixture has the following ingredients.

EXAMPLE 2

|  | Percent by weight |
|---|---|
| Polyethylene powder | 35.72 |
| Nickel powder | 14.28 |
| Silver flake | 50.00 |

The above components can also be varied by 10% of their respective weights either individually or with another ingredient.

Once the proportions of the above ingredients in either Example 1 or 2 have been measured, the ingredients are mixed together until they appear homogeneous.

In order to form a conductive coating from the homogeneous mixture and apply the coating over a foam polyethylene cable the following procedure is performed.

Figure 1:
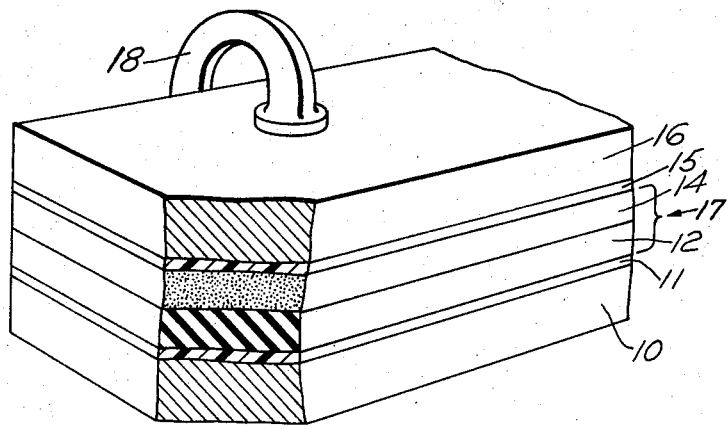
FIG. 1 is an assembly for providing a coating for an electrical cable.

Referring to FIG. 1, a first flat metal plate 10 is covered on its inner surface with a plastic film 11 such as Mylar or other non-adhering high temperature substance. The length and width dimensions of the plate depend on the desired size of the coating to be formed. The thickness of the plastic film used was approximately 5 mils. This dimension, however, is not critical. A 4-6 mil thickness polyethylene film 12 having the same length and width as the plastic film 11 and plate 10 is placed on the plastic film 11. A screen (not shown) is then placed on film 12 and the mixed powder 14 comprised of the materials of either Examples 1 or 2 is sprinkled on the and through the interstices of the screen. The screen is then squeegeed to level off the mixture 14. Then the screen is removed. The size of the screen used can vary from 25 to 200 mesh and have a depth for providing a 5-10 mil thickness for the mixed powder 14.

Another layer of plastic film 15 similar to film 11 is applied on top of powder 14. A second metal plate 16 is then placed on top of film 15 and metal plates 10 and 16 are clamped together by any clamping means such as C clamp 18. The assembly formed is placed in an oven or otherwise heated to 300-350° F. When the powder 14 heats up and begins to flow out of the assembly the heat is removed and the assembly is permitted to cool. The heating normally takes between an hour and an hour and a half. The purpose of the heating is to bond the polyethylene film 12 to the mixture 14 to form a coating 17.

The clamp 18 and metal plates 10 and 16 are then removed from the assembly. The plastic films 11 and 15 are then peeled off of the bonded coating 17. The function of the films 11 and 15 is to prevent the coating 17 from adhering to plates 10 and 16.

The coating 17 as formed has a high electrical resistant layer comprised of the polyethylene film 12 and a low electrical resistant layer comprised of mixture 14.

Figure 2:
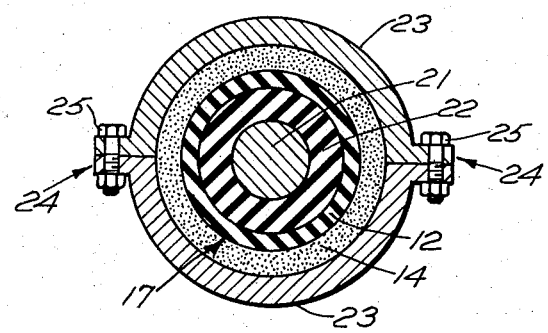
FIG. 2 is an assembly for bonding the coating of FIG. 1 to the electrical cable.

Referring now to FIG. 2 there is shown a cable 20 comprised of a copper conductor 21 and a polyethylene foam jacket 22. The coating 17 formed of layers 12 and 14 is wrapped around jacket 22 with the polyethylene film 12 placed in juxtaposition to polyethylene jacket 22. A cylindrical split mold 23, having flanges 24, is then wrapped around coating 17. Split mold 23 has an inside diameter equal to the outside diameter of the coating 17. The mold 23 after being placed over the coating 17 is clamped by nuts and bolts 25. The clamped assembly is heated to 325° F. causing a fusion between the polyethylene foam jacket 22 and the film 11. The heating normally takes between one-half hour and one hour. After such fusion the heat is removed from the assembly and after cool-down the coated cable is removed from the split mold 23.

Figure 3:
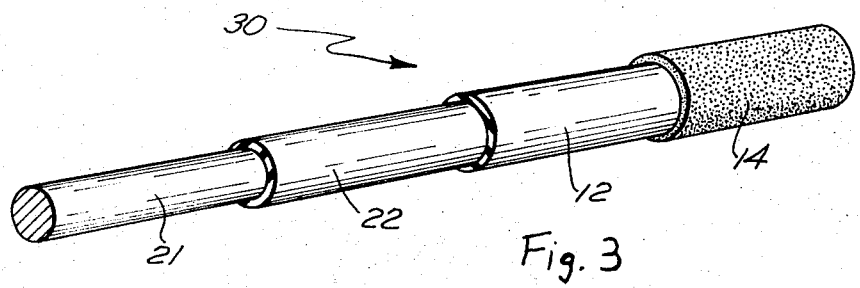
FIG. 3 shows the coated cable formed by bonding the coating of FIG. 1 to the electrical cable.

FIG. 3 shows a view of the coated cable 30 formed by the processes described. The cable 30 has layers partially removed for clarification. The respective components of cable 30 are the copper conductor 21, polyethylene foam layer 22, polyethylene film layer 12 and conductive layer 14.

There has therefore been described an electrical cable and the processes by which it is made.

The resistivity of the outer surface of the cable measures 1 ohm or less per foot of length. In addition, the outer surface is suitably insulated from the internal conductor along its length. The cable formed is rugged enough to withstand the rigors of a marine environment whether rolled on a cable reel or unrolled and is capable of going through submarine hull fitting systems without having its electrical properties impaired.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A process of providing a conductive material on the outer surface of a foam polyethylene jacketed cable wherein the conductive material forms part of a bonded coating comprising the steps of:
   forming a mixture by mixing polyethylene powder, nickel powder and silver flake until said mixture appears homogeneous;
   covering a first metal plate with a first plastic film;
   covering said first plastic film with a polyethylene film;
   placing a screen on said polyethylene film;
   sprinkling said mixture on said screen;
   squeegeeing said screen to level off said mixture;
   removing said screen;
   covering said mixture with a second plastic film;
   covering said second plastic film with a second metal plate;
   clamping said first and second metal plates to form an assembly;
   heating said assembly until said mixture starts to flow;
   cooling said assembly;
   removing said first and second metal plates and said first and second plastic films to form the bonded coating; and
   fusing said bonded coating to the outer surface of the foam polyethylene jacketed cable so that said polyethylene film adheres to said foam polyethylene jacketed cable.

2. A process according to claim 1 wherein the step of fusing further comprises the steps of:
   forming a first enclosure by enclosing (a) said polyethylene jacketed cable with said bonded coating so that the polyethylene jacket of said polyethylene jacketed cable and said polyethylene film of said bonded coating are in juxtaposition with each other;
   forming a second enclosure by enclosing said first enclosure in a split mold;
   heating said split mold to fuse said polyethylene film to said polyethylene jacket;
   cooling said split mold; and
   removing said split mold.

References Cited
UNITED STATES PATENTS

| | | | |
|---|---|---|---|
| 3,332,814 | 7/1967 | Yoshimura et al. | 156—56 |
| 2,005,360 | 6/1935 | Boggs | 156—56 |
| 2,936,814 | 5/1960 | Yakubik | 156—298 |
| 2,256,701 | 9/1941 | Bacon | 264—159 |
| 3,106,603 | 10/1963 | Webb | 174—115 |
| 3,639,674 | 2/1972 | Stier | 174—102 R |
| 2,211,584 | 8/1940 | Ruben | 174—102 C |
| 3,399,070 | 8/1968 | Scharf | 117—22 |
| 3,516,859 | 6/1970 | Gerland et al. | 117—218 |
| 3,692,925 | 9/1972 | Kindij | 174—120 C |
| 3,700,537 | 10/1972 | Scher | 156—289 |
| 3,761,338 | 9/1973 | Ungar et al. | 156—209 |

DOUGLAS J. DRUMMOND, Primary Examiner

B. J. LEWRIS, Assistant Examiner

U.S. Cl. X.R.

117—22, 100 C; 156—245, 278, 298; 174—102 C, 110 F, 118